Feb. 23, 1926.

A. M. CURRIER 1,574,609

INSERTABLE SAW TOOTH AND HOLDER THEREFOR

Filed August 27, 1924

WITNESSES

INVENTOR
Alfred M. Currier
BY
ATTORNEYS

Patented Feb. 23, 1926.

1,574,609

UNITED STATES PATENT OFFICE.

ALFRED MAXWELL CURRIER, OF ABERDEEN, WASHINGTON.

INSERTABLE SAW TOOTH AND HOLDER THEREFOR.

Application filed August 27, 1924. Serial No. 734,528.

*To all whom it may concern:*

Be it known that I, ALFRED MAXWELL CURRIER, a citizen of the United States of America, and a resident of Aberdeen, in the county of Grays Harbor and State of Washington, have invented a new and Improved Insertable Saw Tooth and Holder Therefor, of which the following is a description.

My invention relates to insertable saw teeth and holders and has for its general object to provide a novel and secure means for holding the saw teeth removably in position in a manner so that the strains and pressures will not affect the tension of the saw. The present invention especially relates to the type of tooth and holder assemblage forming the subject matter of an application filed by me May 22nd, 1924, Serial Number 715, 157.

In common with the assemblage forming the subject of my aforenamed application, the present invention has for objects to provide a stop for the saw tooth on the holding means as distinguished from the common practice of providing a tooth stop on the blade; and to provide a tooth assemblage of such a character as to leave ample saw blade strength between the teeth assemblages.

In addition to providing means for carrying out the general stated object, the present invention has in view to provide a saw blade so formed and so equipped with a tooth and tooth-holding assemblage that the saw blade may be filed down at the front of the clearance space and thus in front of the tooth and holder assemblage for the escape of sawdust to such extent as may be determined by the saw filer for particular work.

The features of invention characterizing the present application, will more clearly appear as the description proceeds.

Reference is to be had to the accompanying drawings forming a part of this specification, it being understood that the drawings are merely illustrative of one example of the invention.

Figure 1:
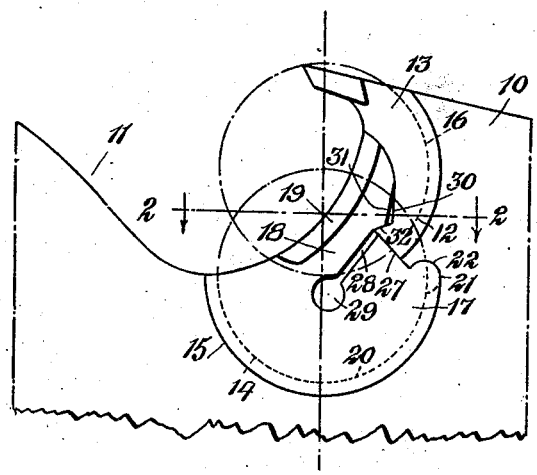
Figure 1 is a fragmentary side elevation showing a portion of a saw blade provided with my improved tooth and tooth-holding means.
Figure 2:
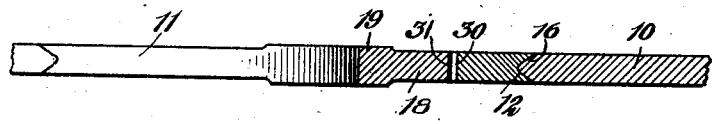
Figure 2 is an enlarged transverse section as indicated by the line 2—2 of Figure 1.

In the illustrated example of my invention the numeral 10 indicates a fragment of a saw blade; 11, the saw clearance spaces in front of the teeth; 12, a seat at the back of the tooth 13 and receiving the pressure of the tooth; and 14, a curved seat on the saw blade V-shaped in cross section for receiving the tooth holder 15. The seat 12 is also V-shaped in cross section and said seat is concaved while the back of the tooth 13 is convexed, said back of the tooth having a V-groove 16 corresponding with the cross section of edge 12.

The tooth holder 15 includes an anchoring member or base portion 17 and a blocking strut portion 18 extending outwardly from said base member. The front edge 19 of the strut 18 is of known form. The base 17 has an inner edge 20 curved to accord with the curvature of the seat 14 on the saw blade and presents a V-shaped groove corresponding with the cross section of said seat 14. At the rear end of the base 17 of the holder 15, said holder is given a formation to present a curved protuberance 21 that enters in a corresponding curved recess 22 in the saw blade at the rear end of the curved seat 14, the blade 10 at recess 22 thus forming the stop limiting the movement of the holder 15 into its position in the saw blade.

The front edge 24 of the tooth 13 and the opposed bearing edge 25 of the strut 18 are curved and said edges may have any desired contacting surfaces.

In accordance with my invention I provide on the base of the holder 15 a shoulder 27 extending from the curved protuberant member 21 toward the strut 18. The base 17 is separated from the strut 18 by a slot 28 complementary to a round hole or recess 29 in the holder. The shoulder 27 extends in a line transverse to the curved tooth seat 12 on the blade and extends beyond the same to lie in the path of the tooth 13 when the latter is inserted. Thus, the shoulder 27 forms the tooth stop of the saw as distinguished from providing a tooth stop on the saw blade. The hole 29 is adapted to receive an operating tool for withdrawing the holder and tooth. It will be seen that the edge 12 of the saw blade and the pressure edge 25 of strut 18 of the holder 15 form an arcuate space accommodating the tooth 13.

It is to be noted that the curve of the seating edge 12 for the tooth 13 and the curved lines of the seating edge of said tooth are struck from a center materially outward of the center from which are struck the curves of the seat 14 for the tooth holder 15 and the corresponding curve of the seating edge of said tooth holder. By providing a tooth holder having a curved seating edge and having a blade with a correspondingly curved seat struck from the center but materially within the center from which the curved lines at the back of the tooth are struck, two important results are obtained in that the forces developed in the operation of sawing tend to cause the tooth holder to have an increasing hold on the tooth and the stresses on the holder instead of being in a direction tending to cause the holder to work out of its seat tends in the opposite direction to constrain the holder to maintain its seat, that is to say, the force exerted on the tooth will be transmitted in an inward direction to the strut 18 of the tooth holder 15 and the force will be exerted on the tooth holder in a direction to force said tooth holder against the wall of the curved recess 22 instead of in the opposite direction. Another result of the different centers from which the tooth curves and the holder curves are struck, is that the holder is seated sufficiently inward to leave a portion of the blade and a portion of the holder in front of the tooth adapted to be filed away as for example to the dotted line shown at the left-hand side of the clearance space 11 in Figure 1. This is so because there is a greater material of the saw extending from the front of the clearance space 11 to the back of the next forward tooth and a sweeping curve can be given the edge of said material thus defining the clearance space 11 at the front. The filer is thus enabled to file down the saw blade and holder to whatever extent it may be necessary to provide ample clearance for the escape of sawdust without lessening the holding function of the tooth holder 15. The filing of the blade and a fragment of the holder may be done while still insuring a firm seating of the holder because the holder has no tendency to work out of the seat into the clearance space, but, on the contrary, the stresses exerted on the holder is in a direction to resist all tendency to a displacing movement of the tooth holder.

It is to be noted that the front of the tooth 13 is formed with a straight surface portion 30 approximately parallel with the radial line indicated by those dot-and-dash lines at a slight angle to the vertical in Figure 1. Also, it will be observed that a corresponding surface 31 is produced on the end or back of the strut 18 in a position opposite to the surface 30 and at an acute angle thereto. Below the surface 30 at the front of the tooth 13 is a surface 32 at an angle to the surface 30 extending forwardly therefrom. The angle of the surface 31 has such relation to surface 30 that a triangular space is formed between the end of the strut 18 and the front surface of the tooth 13, said surfaces 30 and 31 forming with a portion of the surface 32 a triangular space at the end of the strut. This results in a contact of the strut at two separated portions of the tooth 13 to give an effective bearing of the tooth holder against the tooth, the engagement of a strut 18 with a tooth 13 being near the outer portion of the end surface of said strut and a portion of the inner surface of the strut. It is to be observed further in connection with the provision of available material for the filing into the saw blade and into the anchoring member 14 at a clearance space that the outer edge of the anchoring portion disposed at a clearance space 11 and the material of the saw blade directly adjacent to said forward portion of the anchoring portion, present edges forming part of the same curved line which sweeps forwardly toward the next tooth in advance. The unitary curve thus presented by the saw blade between the said anchoring portion and the next tooth in advance, may be varied by the saw filer to provide such a clearance space for the sawdust as may be desirable in work of a given character.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claim.

Having thus described my invention I claim:

A saw including a blade, insertable teeth seated in said blade, and tooth holders for the teeth, each holder comprising an anchoring portion seated in the blade and against which the inner end of the tooth is adapted to seat, said anchoring portion including a rounded protuberance seated in a correspondingly shaped pocket in the blade, and a shoulder abutting the blade and offering a seat for the tooth, each holder also including a blocking strut portion disposed to bear against the front of that tooth in the rear thereof, each tooth presenting surfaces at the front thereof at an angle to each other, and the strut portion of the holder presenting surfaces at angles to each other, and opposed to the said surfaces of the tooth, said strut contacting with the tooth at separate places at the respective angular surfaces of the tooth.

ALFRED MAXWELL CURRIER.